W. KIESER.
SHAFT PACKING.
APPLICATION FILED JULY 9, 1908.

951,374.

Patented Mar. 8, 1910.
3 SHEETS—SHEET 1.

Witnesses:

Inventor:
Walter Kieser,
by Att'y.

W. KIESER.
SHAFT PACKING.
APPLICATION FILED JULY 9, 1908.

951,374.

Patented Mar. 8, 1910.
3 SHEETS—SHEET 2.

Witnesses:

Inventor,
Walter Kieser,
By Albert H. Davis
Att'y.

UNITED STATES PATENT OFFICE.

WALTER KIESER, OF BERLIN, GERMANY, ASSIGNOR TO GENERAL ELECTRIC COMPANY, A CORPORATION OF NEW YORK.

SHAFT-PACKING.

951,374.   Specification of Letters Patent.   Patented Mar. 8, 1910.

Application filed July 9, 1908. Serial No. 442,661.

*To all whom it may concern:*

Be it known that I, WALTER KIESER, a citizen of Switzerland, residing at Berlin, Germany, have invented certain new and useful Improvements in Shaft-Packings, of which the following is a specification.

This invention relates to packings for preventing leakage of air into the interior of an elastic fluid turbine or other similar apparatus or of motive fluid from said interior outward through the opening provided in the casing for the shaft which is extended outwardly from the rotor to drive the load. The packing can also be used to prevent leakage between adjacent stages of a multistage turbine and to pack rotating members other than shafts.

The object of the invention is the provision of a packing which will effectively prevent leakage while accommodating itself to the expansion of the turbine casing and rotor and avoiding friction between the shaft or other rotating member and the packing.

Figure 1:
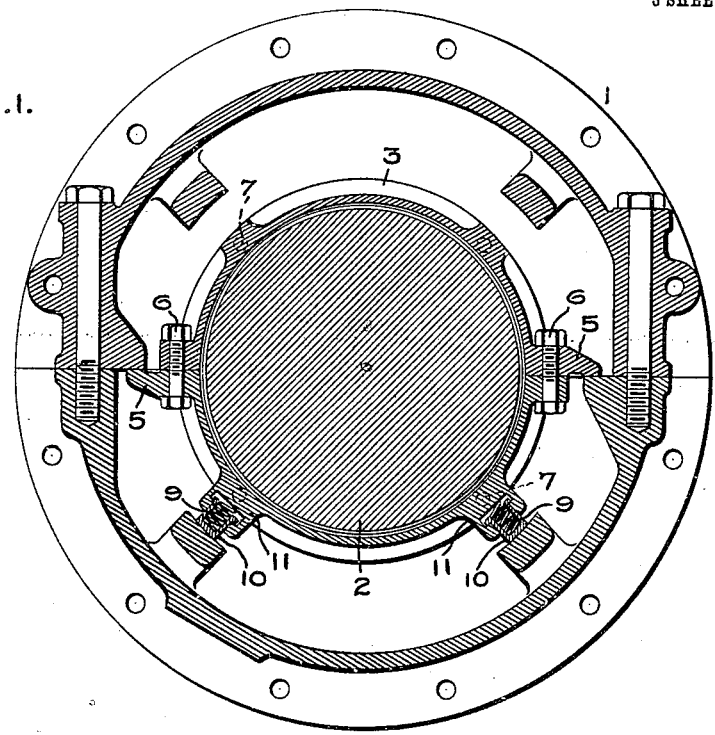
Figure 2:
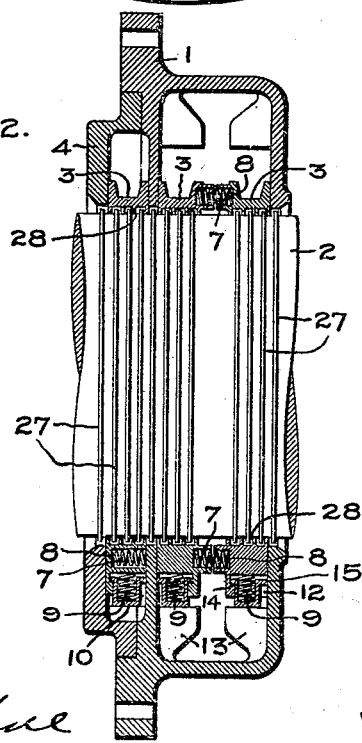
Figure 3:
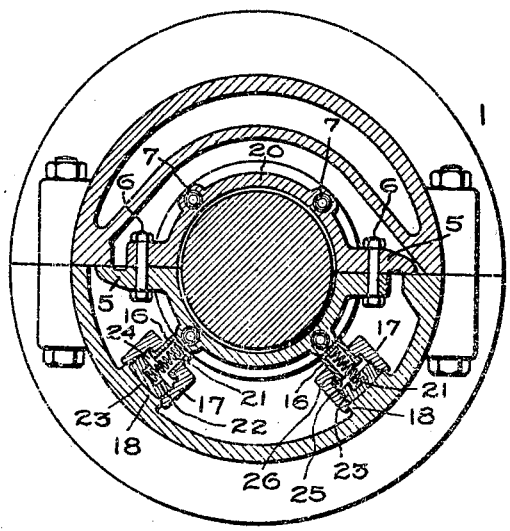
Figure 4:
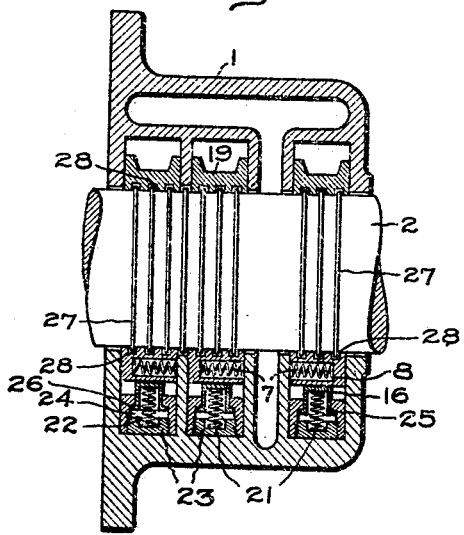
Figure 5:
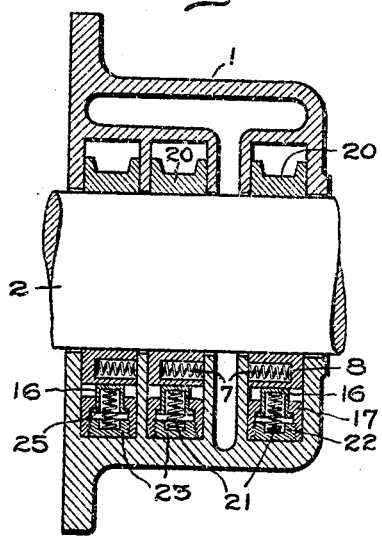
Figure 6:
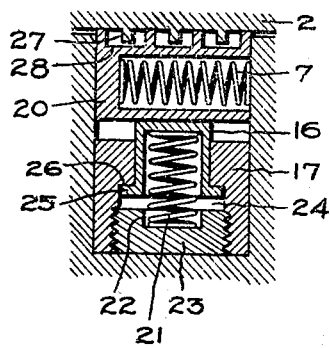
Figure 7:
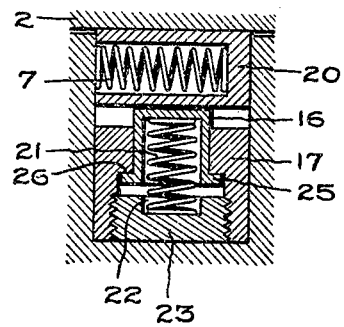
Figure 8:
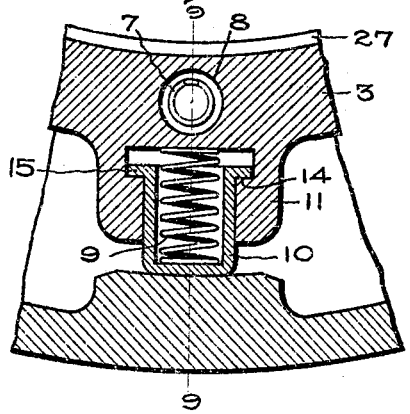
Figure 9:
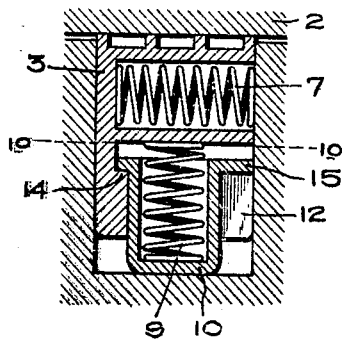
Figure 10:
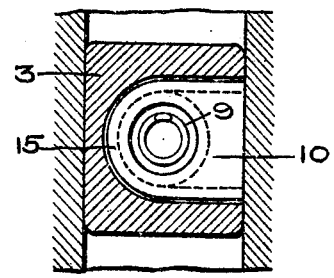

In the accompanying drawings which illustrate some of the embodiments of my invention, Figure 1 is a transverse section through a packing and its inclosing casing; Fig. 2 is a longitudinal section through said packing and its casing; Fig. 3 is a transverse sectional view of a modification; Fig. 4 is a longitudinal section of the packing shown in Fig. 3; Fig. 5 is a similar view of a slight modification; Fig. 6 is an enlarged sectional view of a packing ring of the type shown in Fig. 4 and the means for positioning it relative to the shaft and for pressing it into lateral engagement with the casing; Fig. 7 is a similar view of a packing ring of the type shown in Fig. 5; Fig. 8 is a sectional view showing on a larger scale means similar to that delineated in Fig. 1 for positioning a labyrinth packing ring relative to the shaft; Fig. 9 is a sectional view on the line 9—9 of Fig. 8 showing a shaft without ribs or projections; and Fig. 10 is a sectional view on the line 10—10 of Fig. 9.

In the two-part casing 1 are provided, for the purpose of packing the shaft 2, a number of packing rings 3 which are located between walls or partitions 4 forming a part of the casing. The casing is preferably made in two parts, as shown, for convenient access to the packing, but other constructions can be used if desired. This casing can be formed separate from the main turbine casing and secured thereto, or it can form an integral part of said casing under some circumstances. The rings 3 are movable to a limited extent in a direction transverse to the shaft and are prevented from rotating with the shaft by the oppositely located projections 5 which engage suitable shoulders or projections on the casing. For convenience in assembling and inspecting the packing, the rings are preferably made in two or more sections which are secured together by bolts 6 or other fastening devices. Each ring is pressed by springs 7 located in the pockets 8 into lateral engagement with one of the walls or partitions 4 to form a substantially steam-tight joint between the ring and said partition. These joints are located in such a manner that they retard or prevent the flow of steam from the interior of the main turbine casing to the interior of the casing 1 and also prevent or retard the outward flow of any steam which may enter the interior of the casing 1. When the pressure in the turbine casing is less than atmospheric pressure, the joints serve to retard or prevent the leakage of air into said casing.

Turbine shafts must be made of relatively large diameter to prevent springing or whipping of the shaft when rotating. The rings 3 have a correspondingly large diameter and are of considerable weight. In order to prevent the heavy rings 3 from becoming seated upon the horizontal shaft and thereby causing friction between them and the shaft, each ring is supported or positioned by a number of spring devices. With the horizontal shaft shown, it is sufficient if the devices are disposed on the lower side of the ring 3 but with a vertical shaft they should be uniformly distributed around its circumference. These devices include springs 9 located between the outer portion of the rings and the inner wall of the casing and they are so arranged that the rings are not pressed against the shaft when the machine is running. Thus the shaft can rotate without friction in the rings which form the stuffing box or packing. To secure this result, it is necessary that some means be provided for limiting the amount of motion that the springs can impart to the ring. This is done in some of the embodiments of the invention by locating one end of each of the springs within hollow plungers 10 which are mounted for a limited sliding movement in lugs 11 on the rings 3, the other ends of the springs bearing against the bodies of the rings at the bottoms of open pockets or slots 12 formed in one side of the rings 3 to permit the plungers 10 to be inserted and removed from the side of said rings. The outer ends of the plungers bear against abutments 13 on the inner wall of the casing. The slots 12 are provided with shoulders 14 which by engagement with the flanges 15 on the plungers limit the outward movement of the latter.

In the modifications shown in Figs. 3 to 7, the plungers 16 are mounted for limited movement in blocks 17 engaging abutments 18 on the inner wall of the casing and the ends of the plungers bear against the bodies of the rings 19 or 20. The springs 21 are located within the plungers with one end entering sockets 22 formed in screw-plugs 23 which close the outer ends of the chambers 24 within the blocks and also permit the insertion of the plungers and springs. The flanges 25 on the plungers engage shoulders 26 on the blocks which limit their movement toward the shaft. With all of the constructions described, the correct position of the rings is insured even though the strength of the individual springs may be unequal.

In Figs. 2 and 4, the shaft is provided with a series of rings or projections 27 forming grooves between them, which projections coöperate with a corresponding series of grooves 28 having projections or rings between them formed on the inner surface of the rings 3 or 19, thus forming a labyrinth packing to prevent leakage along the shaft. The number of rings and the extent of this packing may be varied to suit different operating conditions; the form shown in the drawings being intended as an illustration of the general construction of the packing. Under some conditions the arrangement of the projections 27 and grooves 28 can be reversed, while under others they may be provided on one member only, Fig. 9, or omitted altogether as shown in Figs. 5 and 7.

The packing rings are preferably formed of a relatively soft material which will not grind away the shaft in case the ring should happen to come in contact with it. When first assembled and before the turbine has been operated under steam, the rings are concentric with the shaft and separated therefrom by a small clearance which can be adjusted, if necessary, by filing off the ends of the plungers or the surfaces of the flanges 15 or 25 which engage the shoulders 14 or 26. When the turbine is operated under steam, the expansion of the turbine casing and the rotor may disturb the above described concentric relation of the rings and the shaft. The shaft will usually, because of the small clearance between it and the packing rings, be then brought into contact with the latter and will wear away the inner surface of the rings until there is substantially no friction between them and the shaft. This wearing of the packing rings is, however, very limited in its extent. If the turbine or other machine be repeatedly heated and cooled, a permanent condition will soon be established by the wear of the shaft on the rings in which the smallest possible play or clearance between the shaft and the packing will be secured, friction will be avoided, and leakage effectively prevented. This clearance has been found to be much less than with other packings and the tightness correspondingly increased. Were the packing rings fixed relatively to the shaft instead of being flexibly supported as above described, the clearance between the shaft and the packing would have to be made relatively large, resulting in considerably leakage, because it is not possible to determine in advance the exact effect of the expansion of the casing and the rotor which takes place in the operation of the turbine and a very liberal allowance must be made, sufficient to meet all contingencies. If this clearance be reduced without employing flexible supports for the rings, or if simple movable rings be used, they will bear upon the shaft and cause considerable friction and possibly binding of the rings.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a shaft, a packing ring which surrounds the shaft and is separated therefrom by a small clearance, a casing for the packing ring, a plurality of devices acting on the outer portion of the ring which flexibly support it in the casing and position it transversely of said shaft, means for pressing a lateral face of the ring and the adjacent portion of the casing into engagement with each other, and oppositely disposed projections on the casing which engage the ring to prevent its rotation.

2. In combination, a shaft, a packing ring which surrounds the shaft and is separated therefrom by a small clearance, a casing for the ring, a plurality of yielding devices within the casing acting in a radial direction on the ring which support it in the casing and position it transversely of the shaft, means for limiting the movement of said devices, and oppositely disposed projections on its ring which engage the casing to prevent the ring from rotating.

3. In combination, a shaft, a packing ring which surrounds the shaft and is separated therefrom by a small clearance, a casing inclosing the ring, a plurality of individual spring devices extending between the inner wall of the casing and the body of the ring which position the ring transversely of the shaft, and means for limiting the movement of said devices.

4. In combination, a shaft, a packing ring which surrounds the shaft, a casing inclosing the ring, a plurality of spring-pressed members located between the inner wall of the casing and the outer portion of the ring and spaced about said ring which position it transversely of the shaft, devices for limiting the movement of said members, and means separate from said members for preventing the ring from rotating.

5. In combination, a shaft, a packing ring closely surrounding the shaft but separated therefrom by a slight clearance, a casing inclosing the ring, a plurality of spring devices extending between the inner wall of the casing and the outer portion of the ring for positioning it transversely of the shaft, and means separate from said devices for pressing a lateral face of the ring into engagement with the casing.

6. In combination, a shaft, a plurality of packing rings which surround the shaft, a casing inclosing the rings and having transverse walls or partitions between which the rings are located, a plurality of spring-pressed radial members engaging the outer portion of each ring to position it transversely of the shaft, spring devices for pressing each ring laterally into contact with an adjacent wall or partition, and means separate from said members for preventing the rotation of the rings.

7. In combination, a shaft, a packing ring surrounding the shaft, there being a labyrinth packing between the ring and the shaft to check leakage along the shaft, a casing inclosing the ring, spring devices arranged parallel to the axis of the shaft for pressing a lateral face of the ring into engagement with the casing, and means for preventing the ring from rotating.

8. In combination, a shaft, a packing ring surrounding the shaft, there being a labyrinth packing between the ring and the shaft to check leakage along the shaft, a plurality of spring devices acting on the outer portion of the ring to position it transversely of the shaft, a casing for the ring and devices, and oppositely disposed members on the ring and casing which engage each other to prevent the ring from rotating.

9. In combination, a shaft, a packing ring surrounding the shaft, coöperating series of grooves and projections on the shaft and the ring which form a labyrinth packing to check the leakage along the shaft, a plurality of spring-pressed radial members acting on the ring to position it transversely of the shaft, devices for limiting the movement of said members, a casing inclosing the ring, a plurality of spring devices which press a lateral face of the ring into engagement with the casing, and means for preventing the rotation of the ring.

10. In combination, a shaft, a packing therefor including a ring formed in halves which surrounds the shaft, means for securing the halves of the ring together, a casing for the packing, projections on the ring which engage the casing to prevent rotation of the ring, coöperating series of grooves and projections on the shaft and the ring which form a labyrinth packing to check leakage along the shaft, a plurality of spring-pressed radial members spaced about the periphery of the ring and acting on said ring to position it transversely of the shaft, devices for limiting the movement of said members, and a plurality of springs arranged parallel to the axis of the shaft which press one face of the ring into engagement with the casing.

11. In combination, a horizontal rotating shaft, a group of packing rings surrounding the shaft, a casing inclosing the rings, oppositely disposed shoulders on the inside of the casing which are located on opposite sides of a horizontal plane passing through the axis of said shaft, oppositely disposed projections on the rings which are located on opposite sides of the horizontal diameter of said rings and engage said shoulders to prevent rotation of the rings, a plurality of spring-actuated members which act in a radial direction on the lower half of each ring to position it in the casing transversely of the shaft, and means for limiting the movement of said members.

12. In combination, a rotating shaft, a packing ring surrounding the shaft, there being a labyrinth packing between the ring and the shaft, a casing for the ring, means for positioning the ring in the casing transversely of the shaft comprising spring-pressed radial members mounted in the ring and projecting therefrom into engagement with the casing, and means for limiting the outward movement of said members.

13. In combination, a rotating shaft, packing rings surrounding the shaft, there being a labyrinth packing between the rings and the shaft, a fixed casing inclosing the rings, means for positioning the rings in the casing transversely of the shaft comprising a plurality of spring-pressed radial members mounted in the rings and projecting therefrom into engagement with the inner wall of the casing, shoulders on the rings, flanges on said members which engage the shoulders to limit their outward movement, and springs for pressing each ring laterally into engagement with the casing.

In witness whereof, I have hereunto set my hand this 10th day of June, 1908.

WALTER KIESER.

Witnesses:
FRIEDRICH GANZERT,
LUDWIG CUHELIE.